Sept. 11, 1945.  W. F. OCENASEK  2,384,732
FEED MECHANISM
Filed April 26, 1944   2 Sheets-Sheet 1
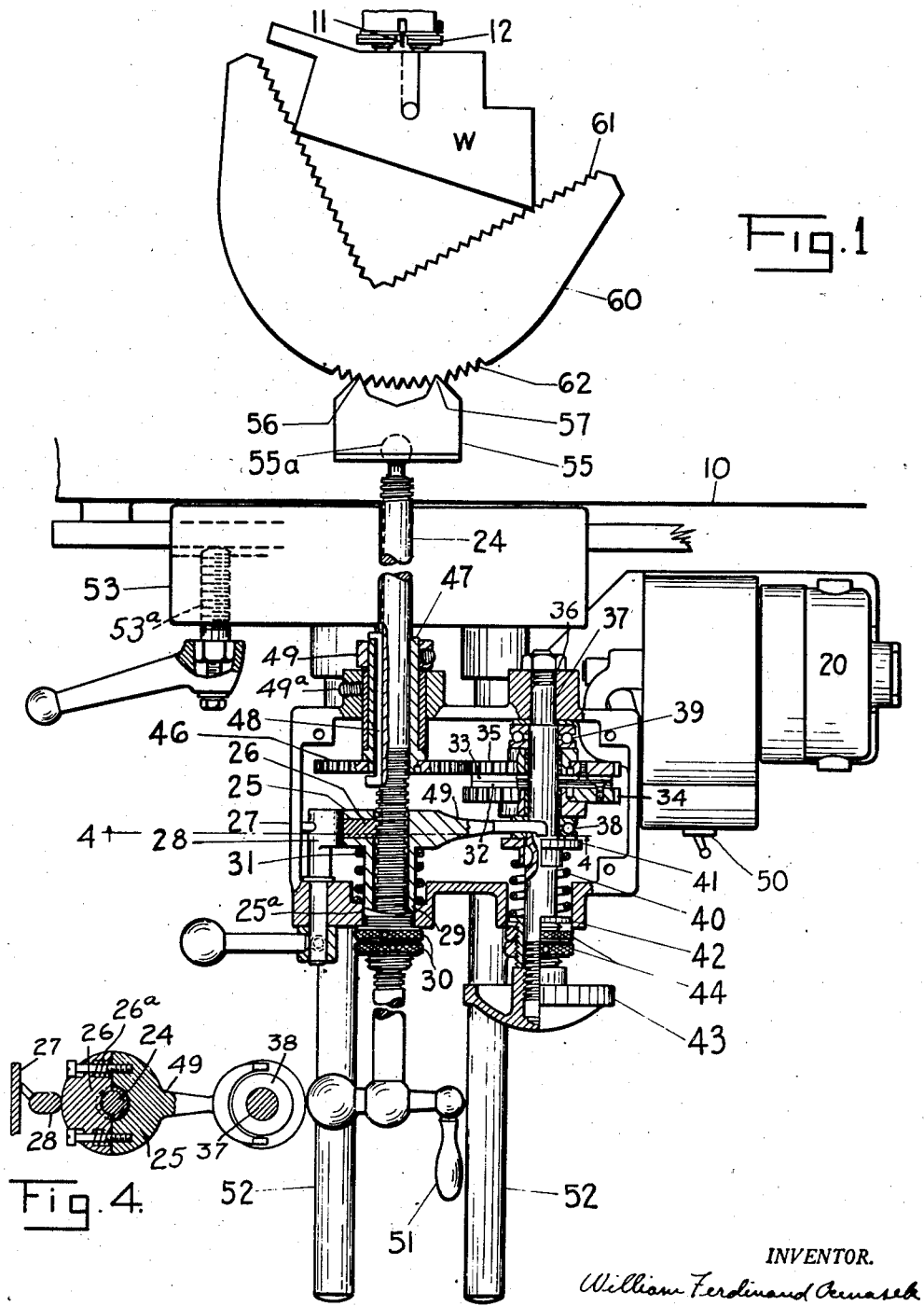
INVENTOR.
William Ferdinand Ocenasek
BY
Albert F. Nathan Sept. 11, 1945.  W. F. OCENASEK  2,384,732
FEED MECHANISM
Filed April 26, 1944  2 Sheets-Sheet 2
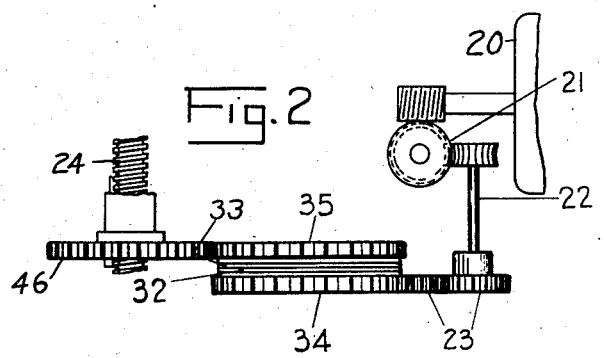
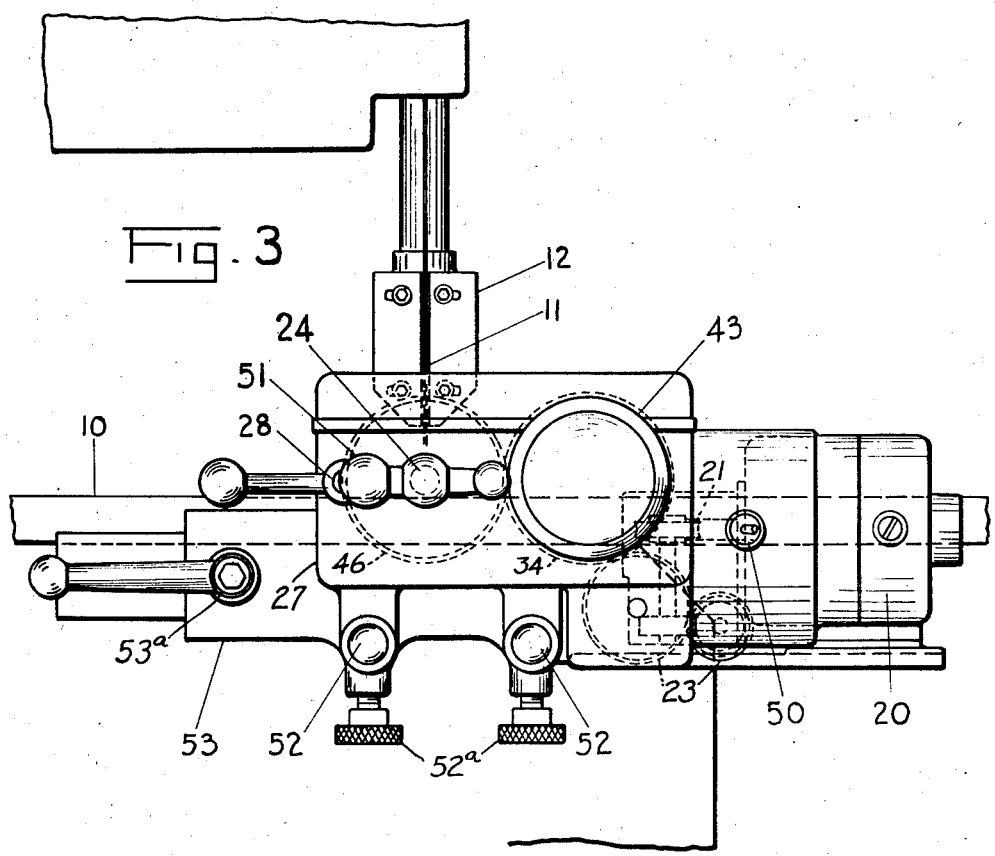
INVENTOR.
William Ferdinand Ocenasek
BY
Albert F. Nathan Patented Sept. 11, 1945

2,384,732

UNITED STATES PATENT OFFICE 2,384,732

FEED MECHANISM

William Ferdinand Ocenasek, South Plainfield, N. J., assignor to Walker-Turner Co. Inc., Plainfield, N. J., a corporation of New York Application April 26, 1944, Serial No. 532,753

6 Claims. (Cl. 29—68)

This invention is for automatically feeding, at rates depending upon their toughness or hardness, work-pieces to a saw; all sufficiently within the ability of the saw to operate throughout a long-life without need for replacement. Devices for mechanically feeding metal, especially non-ferrous, to a band-saw have heretofore shortened the normal or expected life of the saw because of the inability of the mechanism to conform to untoward conditions.

In undertaking to obviate such actions, the present invention accomplishes a feed between a saw and workpiece at a rate so controlled that the resulting pressure against the saw will not exceed the strength factor of the saw; and diminishing the predetermined maximum whenever it would result in pressures greater than compatible with long saw-life.

Should the workpieces, for example, vary in sectional area along the line of cut, as in the case of sawing a round bar, the invention aims to effect a progressively diminishing rate of feed as the section increases in thickness and an increasing rate of feed as the section decreases, maintaining thereby, a feed pressure at all times within the capacity of the saw. In a like manner, the invention aims to increase or decrease the feed rate as may be required in the cutting of metals, tool steel for example, wherein the degree of toughness or hardness may vary in different portions thereof; the feed device embodying the principles of this invention operating automatically to vary the feed in accordance with the resistance while maintaining throughout the cut, a moderate pressure.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:

Figure 1 of the drawings in a plan view, partly in section, of a preferred embodiment of this invention applied as an attachment to a metal cutting band saw.

Fig. 2 is a line diagram of the drive from the power source to the feed screw.

Fig. 3 is a front elevational view of the feed unit.

Fig. 4 is a sectional view substantially on the line 4—4 of Fig. 1.

Referring more particularly to Figures 1 and 3, the portions of the band saw machine therein illustrated are of conventional construction having a work supporting table 10 through which a continuous band saw 11 operates. The portions of the saw adjacent the workpiece are supported in a vertically adjustable saw guide 12 above the table, and similarly guided and supported below the table. The upper guide normally occupies a position as close to the work as the latter's thickness will permit in order to bring the back support for the saw as close to the cutting zone as is possible. Despite the closeness of the upper and lower back supports to the zone of cutting, it is impossible to position a saw back supporting element directly behind the saw in the line of cut, and consequently, the area of the saw most requiring support is without it, and when the feed pressure becomes great enough to cause the teeth of the saw to "bite" efficiently, the saw is often caused to bend in its own plane. If the saw dulls slightly, the pressure required to effect cutting must increase and further bending results, and in a relatively short time the saw band breaks.

A similar result often occurs in the cutting of pieces of variable sectional area or of varying degree of hardness. In such instances, the saw meets with continually changing conditions, sometimes little resistance sometimes a great resistance, which repeatedly burden and unburden the saw blade, cause the machine elements to wind up and unwind, and produce erratic sawing action and eventual saw breakage.

The present invention offers a corrective solution to such difficulties by providing a mechanism, which can be in the form of an attachment or an integral part of a machine, which operates to exert a substantially uniform pressure of a predetermined value on the cutting tool, automatically varying the rate of feed between the tool and the work in maintaining said value.

Figs. 1 and 4 of the drawings illustrate a preferred manner and means for attaining the objectives of this invention. In the embodiment disclosed, the power source is a small high speed motor 20 operating through worm gear reduction gearing 21 to develop a speed in shaft 22 of, for example, 105 R. P. M. This speed is further reduced by reduction gearing 23 and finally transmitted to a work feed shaft 24 at a rate such that the latter is turned at approximately 37 R. P. M. normally. The feed screw 24, in the instant embodiment, has a pitch of 8 threads per inch, which with the gear speeds mentioned, affords a longitudinal feed movement of the shaft of 4⅝ inches per minute, maximum. A different power source and gearing may, of course, be adopted if desired.

The feed screw 24 operates through declutchable nut elements 25 and 26 slidingly journaled in bearings 25a afforded by the casing 27. The nut element 26 is normally spring pressed, by recessed springs 26a (Fig. 4), away from engagement with the threads of the shaft 24, but, except for a condition to be mentioned, is normally held in engagement with the screw threads by a lever operated cam member 28. The other member 25 of the nut mechanism is provided with a relatively long sleeve portion 29 that extends through the casing 27 and provided with adjusting nuts 30. The nut member 25 is generally T-shaped, as illustrated in the drawings and mounts between the cross bar of the T and the inner wall of the casing, a substantial spring element 31. By adjusting the nuts 30, the spring 31 may be placed under a selected load.

The function of the spring 31 is to urge the nut forward and to maintain same against an abutment, provided in this instance by the adjustable collars 30, and with the nut member 26 engaged with the threads of the shaft 24, the feed screw shaft is likewise yieldingly urged forward. Normally, the spring 31, which will hereinafter be referred to as the feed spring, is under compression to an extent such that its force will overcome any normal reacting force that opposes forward movement of the feed screw. Should the resistance to forward movement of the feed screw tend to exceed the value of the feed spring, the latter yields slightly and allows the feed nut to recede. The differential action effected by the axially movable nut and the rotating feed screw causes a corresponding reduction in the rate of forward travel of the feed shaft and a proportionate reduction in the cutting pressure. As the resistance to forward movement of the feed shaft decreases, the feed spring 31 urges the nut and shaft forwardly until normal conditions are again restored. In this way, the feed spring functions as a cushion, automatically yielding and modifying the feed rate when the resistance to the forward feed exceeds the normal load value of the spring.

There often are instances, however, when the workpiece may vary greatly in sectional area along the line of cut, or vary greatly in its structural composition and hardness along the line of cut, and to avoid too great a receding movement of the feed nut and a corresponding increase in the force of the feed spring 31, the invention proposes a complementary mechanism for confining the power transmitted to the feed shaft within definite limits. Accordingly, in the feed screw rotating train a device is inserted which functions to effect a decrease in the rate of rotation of the feed screw after a predetermined compression of the feed spring 31 has occurred.

In the embodiment illustrated, the complementary power limiting means is in the form of a pair of friction discs 32 and 33 interposed between driving and driven gears 34 and 35 in the rotating train. The gears 34 and 35 are journaled, in this instance, loosely on a separate shaft 37 one end of which is secured to the casing 27 at 36. Antifriction thrust bearings 38 and 39 are arranged at opposite sides of the driving and driven gears, and the friction discs between the gears are held normally in power transmitting relation by an adjustable power spring 40. One end of the spring operates against a collar 41 bearing against the thrust bearing 38 and the other end of the spring bears against an adjustable stop 42 formed as a sleeve about the shaft 37. The shaft 37 extends beyond the end of the sleeve 42 and is furnished with a thread on which a hand wheel 43 is mounted. As the hand wheel is moved inwardly along the shaft 37 the hub thereof bears against the stop sleeve 42 and forces the latter inwardly along the shaft 37, thus compressing the power spring 40 which yieldingly holds the frictions 32, 33 in power transmitting relation. A pair of check nuts 44 threadably engaging the stop sleeve 42 and adapted to abut against the gear case 27, are provided to variably control the limit of compression of the power spring 40 effected through the hand wheel 43. Once the desired spring pressure has been obtained and the check nuts 44 located and tightened, the hand wheel may be repeatedly operated to disconnect and connect the drive at will, restoring each time the drive is connected, the selected pressure value on the frictions which in turn, controls the torque transmitting capacity of the clutch.

The gear 34 receives its power from the reduction gearing 23 and transmits it to gear 35 through the frictions 32 and 33. Motion in gear 35 is transmitted to the feed shaft 24 through a gear 46 which has a long hub 47 and a splined connection 48 with the feed shaft. The gear 46 is held against axial displacement relative to the gear case 27 by a collar 49 on the projecting hub 47, and a cooperating bushing and bushing retaining screw, indicated generally as 49a.

As the torque load on the feed shaft increases, incident to an excessive receding movement of the feed nut in response to increased work resistance, the feed screw rotating train is caused to yield and thereby effect a reduction in the rate of rotation of the feed shaft. The rate of forward feed of the shaft is thus reduced and a corresponding reduction in the feed pressure occurs. As the work resistance lowers, the drive through the frictions becomes more effective until the condition is again obtained whereat the rate of feed becomes maximum for a predetermined feed pressure.

Theoretically, a friction clutch can be set to yield when the load tends to exceed a predetermined value, but in practice such a device cannot be relied upon to operate as expected. The clutch may yield either too soon or too late, under apparently identical conditions. A feed train incorporating an ordinary overload release clutch is not therefore, practical for the purposes here needed. The present invention, however, proposes a means whereby definite assurance is given that the friction rotating train will yield at the instant the work resistance tends to exceed a predetermined value. This objective is attained in the present invention by establishing a connection between the friction clutch and the feed nut operative to relieve the pressure on the friction discs when the feed pressure on the screw tends to exceed a selected value. Unlike the ordinary friction slip devices, the present construction is such that the rotating train is caused to respond directly to work resistance rather than solely to the torque or power required to effect the feed.

To bring about such action, the feed nut 25, 26 is provided with a finger-like extension 49 that is arranged to engage the clutch collar 41 and exert a pressure thereon in opposition to the power spring 40 whenever the receding movement of the feed nut tends to exceed a definite amount in terms of feed pressure. In the specific construction illustrated the finger 49 has a limited movement relative to the clutch collar 41, during which all load variations are absorbed and compensated for by the feed spring 31 and yielding feed nut. Should the work resistance tend to go beyond the limitations provided, the space between the nut finger 49 and the clutch collar 41 will have been taken up and any unit increase in work resistance occurring thereafter will correspondingly reduce the effective pressure of the power spring on the clutch discs. As a consequence, the yield point of the rotating train is made directly responsive to the work resistance beginning at the point where the feed pressure tends to exceed the limited capacity of the feed spring to absorb it in the performing of its rate modifying function.

The amount of space between the feed nut extension 49 and the clutch collar may normally be such as to produce any desired degree of sensitivity in clutch response following the application of end pressure on the feed screw. A device constructed and having the parts related as shown operates in a highly efficient manner to maintain a feed rate inversely proportional to the work resistance, with ample reserve power in the feed spring to continue the feed under the extreme condition of stoppage of feed screw rotation.

As above mentioned, the feed nut element 26 is maintained normally in engagement with the thread of the feed screw by the manually operated cam 28 along which it is permitted to slide. However, after the feed shaft has been propelled axially forward the extent desired for the completion of the tooling operation, the nut element 25 is released from the shaft by rotating the cam 28 away, and the shaft withdrawn bodily through the sleeve portion 29 of the nut, the desired distance. The splined connection 48 of the drive gear 46 with the shaft permits free translation of the shaft under such conditions.

Starting and stopping of the power drive train is controlled normally by the switch 50 at the side of the motor. With the motor switch in its "off" position, and the power clutch elements 32, 33 practically disengaged by backing off the hand wheel 43, the feed shaft 24 may be rotated and fed axially by the handle 51. During such manual operation of the feed shaft, the feed spring 31 is operative to yieldingly resist counter translation of the feed shaft when encountering work resistance. During hand feeding operations, the yieldable nature of the feed nut and spring mechanism is effective to cushion the reacting forces and effect a varying rate of feed independently of the rate of hand operation of the handle 51.

In the instant embodiment of the invention the gear case 27 houses the differential and power control mechanisms and affords a support for the drive motor 20 and the intervening reduction gearing. The unit so constituted is mounted for adjustment toward or away from the saw upon supporting rods 52 that project from a laterally adjustable bracket 53 that is clamped, as at 53ª, to the table of the machine. Clamp screws 52ª (Fig. 3) are provided to clamp the unit in outwardly adjusted position on the supporting rods 52. In its normal operating position, the feed screw is positioned so that the direction of feed and the reactionary forces are direct and not indirect as would be occasioned by an offset or angular relationship.

In feeding irregular contoured work to the saw of a band saw, it is convenient to employ a U-shaped pusher block 55 having a ball connection 55ª with the leading end of the feed shaft 24. The block 55 lies flat on the table, and the workpiece is placed ahead of it and engaged by the legs 56, 57 of the U. Regardless of the angular position of the pusher to the feed shaft, the line of feed pressure is directly in line with the saw blade. In feeding such pieces as cannot be conveniently held by the two legs 56, 57 of the pusher 55, the same effect may be attained by using another block 60 whose front and rear surfaces are roughened, as at 61 and 62, to engage respectively the workpiece W and the legs of the U-shaped pusher 55.

The mechanism illustrated is operated as follows: the screw shaft 24 is withdrawn a distance sufficient to permit placing of the piece to be cut between the pusher 55 and the saw. The hand wheel 43 is tightened to establish a drive through the friction discs, then the feed nut 26 is engaged and the motor switch turned on. Thereupon, the feed shaft is rotated and moves the workpiece relatively rapidly toward the tool, in this case the saw. As the work engages the saw the initial shock thereof is cushioned by the feed spring 31 after which and assuming the resistance to feeding is not excessive, the work is fed to the tool at a relatively rapid rate. As soon, however, as the work resistance increases and tends to exceed a desired maximum, the feed nut begins to yield. This action slows the feed rate slightly and at the critical instant. If the resistance increases further, the nut yields further until the finger 49 thereof begins to relieve the pressure on the friction discs 32, 33. When the pressure has been relieved sufficiently, the friction discs slide upon one another and effect a reduction in the rate of rotation of the feed screw. Meanwhile, the feed spring continually urges the nut and screw forward (which continues the feed pressure on the work) and assuming that the rotating train actually stops, the spring 31 continues the forward feed. Movement of the feed nut forward (after the finger 49 has applied pressure on the clutch collar 41) has the effect of adding pressure on the friction discs and the rotating drive again starts or picks up speed.

As the end of the cut is approached, the operator may, if desired, unwind the handle 43 and discontinue the propulsion gradually. By correctly tensioning the feed and power springs to suit the capacity of the machine to which the mechanism is applied, no further attention thereto is required on the part of the operator to handle a wide range of work, the device automatically functioning to maintain a balance between the feed rate and the feed pressure which neither overloads or underloads the capacity of the tool at any time.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. An apparatus of the nature disclosed combining a saw, a saw-table through which a saw is adapted to operate, a work-pusher movable along the surface of said table, a rotatable and translatable feed screw shaft operatively connected with said work-pusher for moving same, a nut coacting with said shaft for effecting translation of the shaft, a shaft rotator embodying a friction clutch adapted normally to transmit a predetermined torque, and a finger between said nut and said friction clutch operative to decrease the torque transmitting capacity of said clutch in response to an undue increase in the work resistance encountered in feeding the workpiece to the saw.

2. An apparatus of the character described combining a saw, a work support, a work-pusher movable upon said support, a feed screw connected with said pusher for advancing same, a nut normally coacting with said screw for effecting a feed movement, a spring for maintaining said nut normally in a fixed position relative to the work support, said spring yielding when the end thrust on said screw and nut in effecting a feed movement tends to exceed a predetermined value, a feed screw rotating train, a friction clutch in the rotating train adapted to transmit a predetermined torque, and means operative when the sum of the torque and end thrust forces imposed upon said screw tends to exceed a predetermined value to lower the torque transmitting capacity of said clutch.

3. The combination set forth in claim 2 in which said nut is declutchable from the screw shaft, and a lever operable selectively to clutch and unclutch the nut from the shaft.

4. An apparatus of the nature disclosed combining, a saw, a saw-table through which a saw is adapted to operate, a work-pusher movable along the surface of said table, a rotatable and translatable feed screw shaft operatively connected with said work-pusher for moving same, a normally stationary but axially shiftable nut coacting with said shaft for effecting translation of the shaft, an abutment against which said nut is yieldingly urged, a shaft rotator embodying a friction clutch adapted normally to transmit a predetermined torque, and a finger between said nut and said friction clutch operative to decrease the torque transmitting capacity of said clutch in response to a given axial yield of the nut away from said abutment in effecting a feed movement of the workpiece to the saw.

5. An apparatus of the nature disclosed combining, a saw, a work table adapted to support a workpiece in the performance of a cutting operation, a work-pusher movable on the work table, a pusher propelling screw and cooperating nut, a screw rotator embodying speed change mechanism normally operative to effect screw rotation at a given rate, and a connection between said nut and said speed change mechanism effective when the work resistance to which said screw is subjected tends to exceed a predetermined maximum to actuate said speed change mechanism and reduce the rate of screw rotation.

6. An apparatus of the nature disclosed combining a translatable holder adapted to support a member to be shifted, a rotatable and translatable feed screw connected with said holder for propelling same, a normally stationary but yieldable nut element cooperating with said feed screw, a feed screw rotator embodying a friction disc clutch mechanism, means for adapting said clutch mechanism normally to transmit a selected maximum torque including means for rendering said disc clutch mechanism selectively ineffective and effective at said selected torque setting, and means comprising a finger extending from said normally stationary nut and operatively engageable with said disc clutch mechanism for compelling release of said clutch mechanism in response to a predetermined yield of said nut incident to a given increase in the resistance to translation encountered by said feed screw.

WILLIAM FERDINAND OCENASEK.